United States Patent
Schwarz et al.

[15] 3,643,588
[45] Feb. 22, 1972

[54] COOKING WHEEL ASSEMBLY FOR BROILING HOT DOGS

[72] Inventors: John F. Schwarz; Richard H. Bennett, both of St. Louis, Mo.

[73] Assignee: Hercules Galion Products, Inc., Galion, Ohio

[22] Filed: Oct. 17, 1969

[21] Appl. No.: 867,200

[52] U.S. Cl. ................................ 99/427, 99/441, 99/443, 99/448
[51] Int. Cl. .......................................................... A47g 27/14
[58] Field of Search ............... 198/211; 99/425, 413, 441, 99/448, 449, 480, 346, 386

[56] References Cited

UNITED STATES PATENTS

| | | | |
|---|---|---|---|
| 1,062,001 | 5/1913 | Hall | 198/211 |
| 2,001,703 | 5/1935 | Brown | 99/443 |
| 2,244,670 | 6/1941 | Benedict | 99/427 X |
| 3,372,636 | 3/1968 | Marasco | 99/427 |
| 3,418,920 | 12/1968 | Alexander | 99/427 X |
| 3,504,620 | 4/1970 | Gerhardt | 99/427 |

Primary Examiner—Billy J. Wilhite
Attorney—Kingsland, Rogers, Ezell, Eilers & Robbins

[57] ABSTRACT

There is shown a cooking wheel assembly for broiling hot dogs rotatably mounted for power movement in a cabinet beneath an electric heater. The cooking wheel, which includes a plurality of circumferentially spaced elongated hot dog receiving wire baskets, each pivotally mounted on a wire platform or cover, is welded to the circumferences of two spaced wheels. The automatic relationship of each basket to its cover in 360° of rotation of the spaced wheels is such that in one segment of travel the basket is spaced from its cover, permitting removal of a cooked hot dog and insertion of one for broiling. In the remaining travel segment, the basket and cover trap and roll the hot dog to present all surfaces to the heater.

9 Claims, 10 Drawing Figures

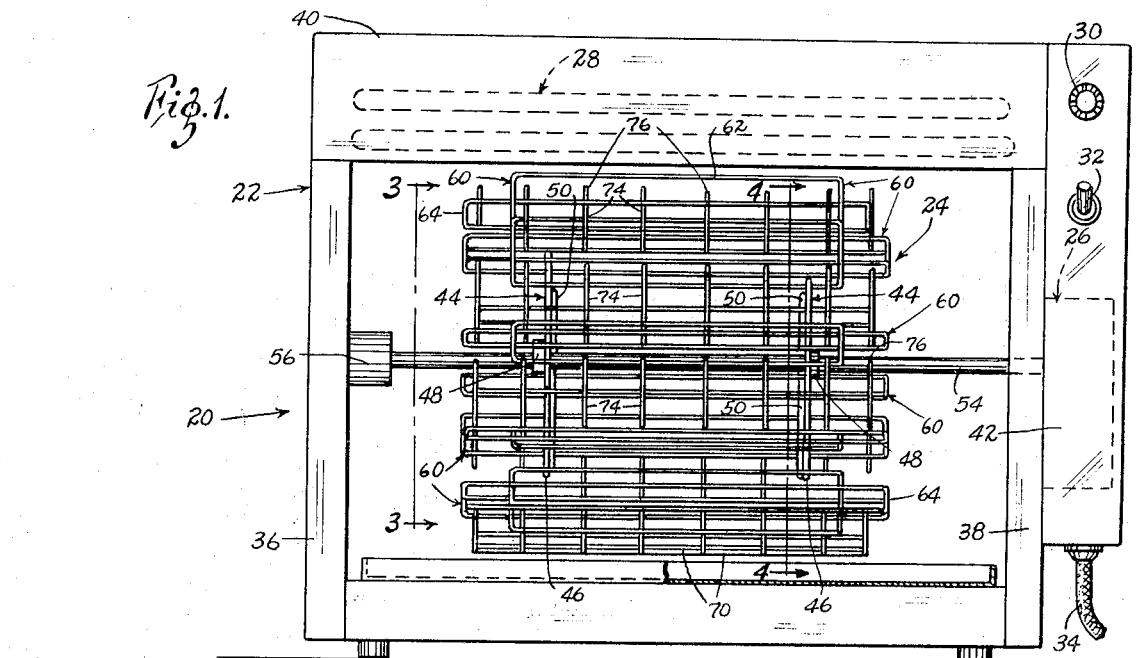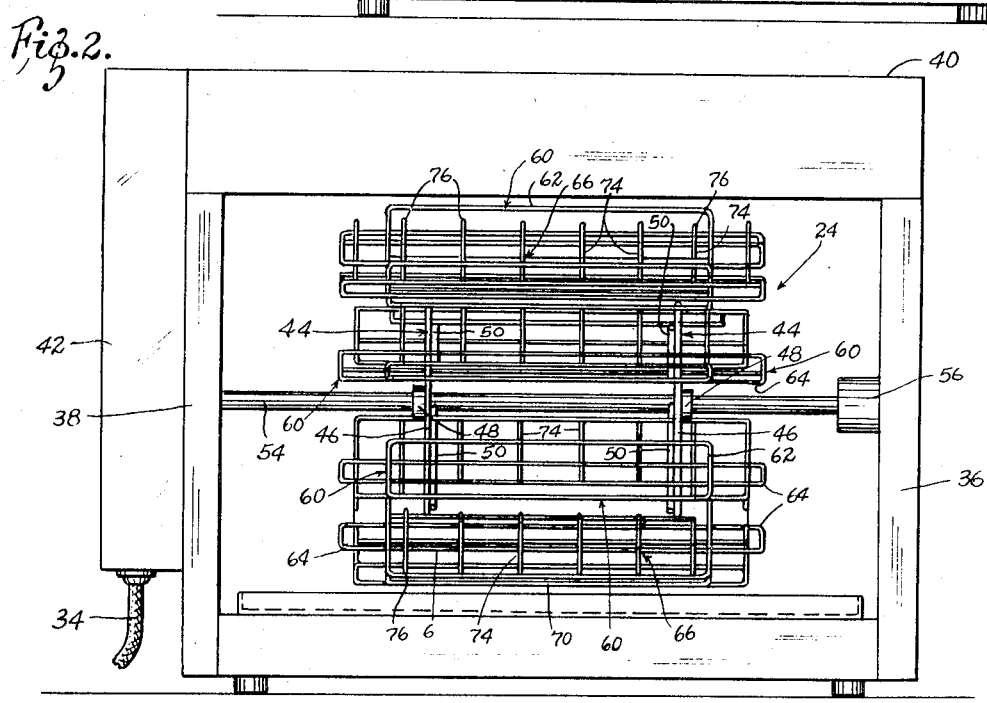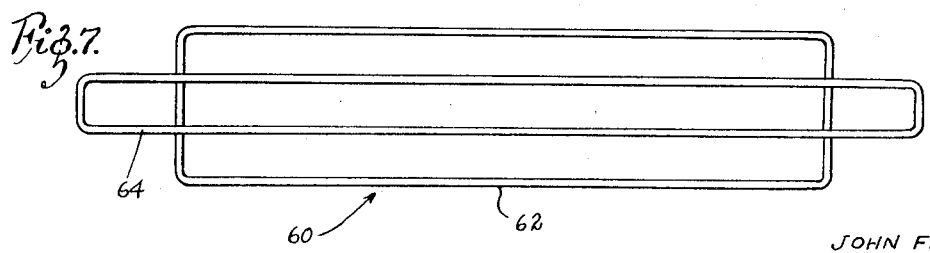

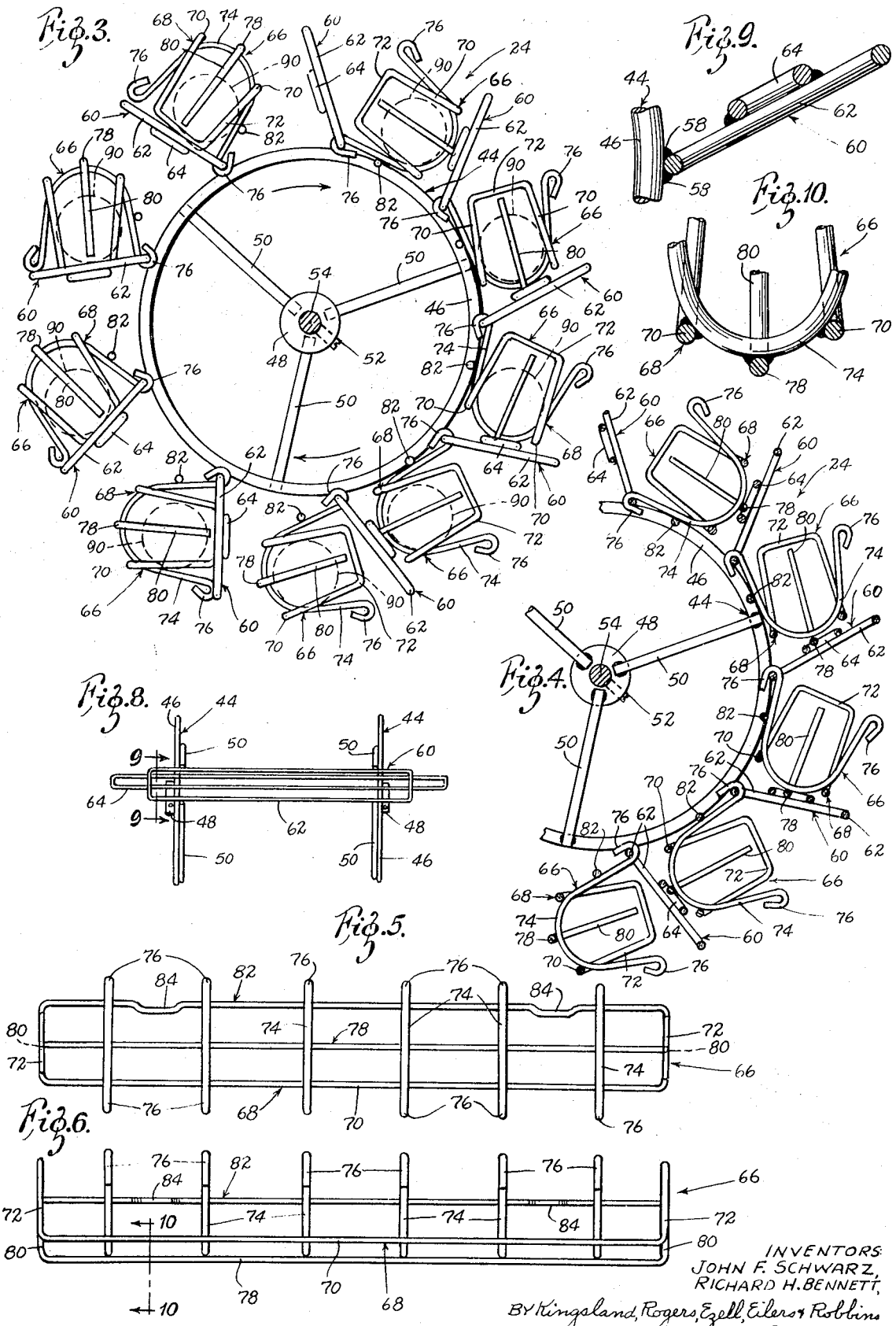

COOKING WHEEL ASSEMBLY FOR BROILING HOT DOGS

BACKGROUND OF THE INVENTION

1. Field of the Invention

The present invention relates generally to the cooking art, and more particularly to a novel broiler including a novel cooking wheel assembly for broiling hot dogs.

2. Description of the Prior Art

Many hot dog broilers have been devised back through the years, both for commercial and home use. Numerous patents have been granted. However, there has long existed, particularly in the commercial field, the need for a hot dog broiler which will securely retain the dogs without piercing, and cook them on all sides satisfactorily while automatically basting each dog with its own juices.

SUMMARY OF THE INVENTION

In brief, the present novel cooking wheel assembly includes a plurality of elongated wire basket-cover units for receiving hot dogs, the covers being welded to the circumferences of spaced wheels at a selected angle. Each basket is pivotally connected to its cover along one adjacent side of each in a manner permitting the other side of the basket to separate from its cover without dropping the hot dog during a predetermined arc of movement of the wheels for access to the basket to remove a cooked hot dog and to insert another. For the remaining travel the basket automatically closes with its cover to hold the hot dog against dumping and to roll it for 360° all-around broiling and basting.

Objects of the present invention are to provide a cooking wheel for broiling hot dogs which fulfills the above long felt need, which is highly efficient in performing its function of hot dog broiling, which is simple to use and operate and is inexpensive in first cost and in operation, which requires minimum maintenance and is built for long trouble-free operation, and which otherwise fulfills the objects and advantages sought.

BRIEF DESCRIPTION OF THE DRAWINGS:

FIG. 1 is a front elevational view of a hot dog broiler incorporating the teachings of the present invention;

FIG. 2 is a rear elevational view thereof;

FIG. 3 is an enlarged cross-sectional view taken on substantially the line 3—3 of FIG. 1;

FIG. 4 is an enlarged cross-sectional view taken on substantially the line 4—4 of FIG. 1, a portion being broken away from conservation of space;

FIG. 5 is a top plan view of the hot dog wire basket;

FIG. 6 is a side elevational view of said basket;

FIG. 7 is a top plan view of the wire platform;

FIG. 8 is a view on a reduced scale of the two wheels with one wire platform welded thereto;

FIG. 9 is an enlarged fragmentary cross-sectional view taken on substantially the line 9—9 of FIG. 8; and FIG. 10 is an enlarged fragmentary cross-sectional view taken on substantially the line 10—10 of FIG. 6.

DESCRIPTION OF THE PREFERRED EMBODIMENT

Referring to the drawings more particularly by reference numerals, 20 indicates generally a hot dog broiler including the principles of the present invention. Broadly, the broiler 20 comprises a cabinet 22, a novel hot dog cooking wheel assembly 24 rotatably mounted in said cabinet 22, an electric motor and gear unit 26 of conventional construction, conventional electric heating element unit 28 having infinite temperature control regulated by a dial 30, a master switch unit for simultaneously energizing the units 26 and 28 controlled by an on-off switch 32, an electric power cord 34, and necessary interconnecting wiring.

The cabinet 22 includes side panels 36 and 38, top 40, and may be open front and rear, as shown, or include front and rear panels or doors. Mounted on the panel 38 is a small housing 42 enclosing the motor and gear unit 26, the on-off switch 32, the temperature control regulated by the dial 30, and wiring.

The novel hot dog cooking wheel assembly 24 comprises two spaced wheels 44, each including a circular rim 46, a hub 48, and connecting spokes 50 secured together by welds, as illustrated, or otherwise. A set screw 52 is threaded into the hub 48 and secures the wheel 44 on a shaft 54 rotatably mounted at one end in a bearing 56 secured to the side panel 36 and at the other end having conventional operative supporting connection with the rotor shaft of the motor and gear unit 26, as indicated in FIG. 1.

Secured as by welding 58 to the circumferences of the two wheels 44 at about a 30° angle with an extended radius of the wheels 44 is a plurality of elongated wire covers or platform 60, nine being shown (FIGS. 3, 7—9). Each cover 60 includes an elongated continuous rectangular base loop 62 and a second narrower longer continuous rectangular loop 64 welded thereon, one side of the base loop 62 being welded to the wheels 44. Both loops 62 and 64 are of heavy gauge wire.

A wire hot dog basket 66 is pivotally mounted on each cover 60 and comprises an elongated continuous base member 68 of heavy gauge wire having sides 70 and upturned ends 72, a plurality of spaced transversely disposed cradle elements 74, having looped free ends 76, welded to the base member 68, a first single wire member 78 welded to the bottom of the cradle elements 74 and turned up at the ends forming end posts 80, and a second single wire 82 welded to the sides of the cradle elements 74 adjacent the rims 46 serving as a stop and having offset portions 84 to fit around the rims 46 to permit a closer movement of the basket 66 towards the rims 46.

One series of looped free ends 76 of each basket 66 is pivotally mounted on that side of the base loop 62 of its associated cover 60 which is welded to the rims 46, as is clear from the drawings. It will be understood that at least two of the looped ends 76 are squeezed into a form preventing accidental removal of the basket 66 from its cover 60.

Nine positions of a single basket 66 is relation to its cover 60 can be observed by reference to FIG. 3, which shows nine such units. The cooking wheel assembly 24 has a clockwise rotation, it being clear from FIG. 3 that, as the basket 66 with a hot dog 90 therein approaches its top position, it begins to and then falls away from the cover 60, leaving the hot dog 90 momentarily in the "V" formed by the cover 60 and the cradle elements 74. The hot dog 90 then rolls by gravity down the cradle elements 74 into the basket 66. Thus, for a major portion of its travel along the right side of the wheels 44, the basket 66 is in open position in respect to its cover 60 for removal of cooked hot dogs and for acceptance of uncooked ones. Thus, there is provided an ample travel arc for these purposes so that the basket 66 may rotate continuously. As the basket 66 approaches its lowest position, by gravity, it begins to assume a closed relation with its cover 60 and remains closed trapping the hot dog 90 in the travel arc at the left of FIG. 3.

Taking a single point on the circumference of a hot dog 90 in a basket 66 and cover 60, in each revolution of the wheel 44 this point will be seen to travel slowly around with relation to the basket 66 and cover 60, planetary gearwise. This is in addition to the normal 360° turn of the basket 66 and cover 60 (FIG. 3). The planetary movement of the hot dog 90 is faster in the 6 o'clock and 12 o'clock areas. This multirotation of the hot dog 90 in each rotation of the wheels 44 automatically bastes the hot dog 90 with its own juices as it cooks, since juices do not squirt or flow out of an unpierced hot dog, but ooze out and very slowly flow down the sides. The wheel assembly 24 turning at average cooking speed, as 1 revolution per minute, moves fast enough for the thick juices to cling to the skin of the hot dogs. The hot dogs 90 cannot accidentally fall out of the baskets 66. It is unnecessary to pierce the hot dogs.

The covers 60 and baskets 66 are disclosed made of heavy gauge wire, which is a convenient material and offers minimum heat shielding effects. However, other materials can be employed. The baskets 66 and covers 60 can take other specific forms.

It is clear that there have been provided a novel cooking wheel assembly and novel broiler for hot dogs incorporating the same which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a broiler for hot dogs and the like comprising a housing, a cooking wheel assemblage for hot dogs and the like rotatably mounted in said housing, said cooking wheel assemblage including at least one basket for freely receiving and carrying a hot dog and the like, rotationally about the axis of the cooking wheel assemblage, energizable means for rotating said assemblage, and energizable means for cooking hot dogs and the like carried by said assemblage, said basket being mounted for effecting 360° exposure of a hot dog and the like to said cooking means in each rotation of said cooking wheel assemblage, said cooking wheel assemblage also including at least one cover member, said cover member being fixed to said cooking wheel assemblage, said basket being pivotally connected to said cover member for relative movement, said basket for a predetermined portion of rotation of said cooking wheel assemblage being positioned in respect to said cover member permitting removal and placement of hot dogs and the like as said cooking wheel assemblage rotates.

2. The combination of claim 1 in which said relative movement between said basket and said cover member is gravity effected as said cooking wheel assemblage rotates.

3. In combination, a broiler for hot dogs and the like comprising a housing, a cooking wheel assemblage for hot dogs and the like rotatably mounted in said housing, said cooking wheel assemblage including at least one basket for freely receiving and carrying a hot dog, and the like, rotationally about the axis of the cooking wheel assemblage, energizable means for rotating said assemblage, and energizable means for cooking hot dogs and the like carried by said assemblage, said basket being mounted for effecting 360° exposure of a hot dog and the like to said cooking means in each rotation of said cooking wheel assemblage, said cooking wheel assemblage also including at least one cover member, said basket being pivotally connected to said cover member for relative movement, said basket for a predetermined portion of rotation of said cooking wheel assemblage being positioned in respect to said cover member permitting removal and placement of hot dogs and the like as said cooking wheel assemblage rotates, said cover member being fixed to said cooking wheel assemblage, said basket pivoting away from said cover member in the top portion of travel and closing with said cover member in the lower portion of travel.

4. The combination of claim 3 in which said cooking wheel assemblage includes a plurality of cover members and pivotally associated baskets.

5. The combination of claim 3 in which the pivotal relationship of basket to cover member is such that the former falls away from the latter at an earlier point of rotational travel with a hot dog and the like therein than when empty.

6. The combination of claim 3 in which said basket and cover member are of wire and the like, permitting cooking heat to effectively reach hot dogs and the like.

7. A cooking wheel assembly for hot dogs and the like comprising wheel means, means for rotatably mounting said wheel means, means mounted on the wheel means for freely supporting hot dogs and the like during operative rotation of said cooking wheel assembly, said freely supporting means effecting substantially continuous rolling of hot dogs during each cycle of said cooking wheel assembly for 360° cooking exposure in each such cycle therefrom, said freely supporting means including at least one cover member and a basket, said cover member being fixed to said wheel means, said basket being pivotally mounted on said cover member.

8. The combination of claim 7 in which said basket and cover member are of wire and the like permitting cooking heat to effectively reach hot dogs and the like.

9. The combination of claim 7 in which said freely supporting means includes a plurality of operatively related said cover members and said baskets.

* * * * *